United States Patent Office 3,104,951
Patented Sept. 24, 1963

3,104,951
OXIDATION OF HYDROGEN SULFIDE
Peter Urban, Northbrook, Ill., assignor to Universal Oil Products Company, Des Plaines, Ill., a corporation of Delaware
No Drawing. Filed Mar. 3, 1961, Ser. No. 93,027
3 Claims. (Cl. 23—225)

This invention relates to the oxidation of hydrogen sulfide and more particularly to a novel method for effecting this reaction.

Hydrogen sulfide is available from a number of sources and, in many cases, is produced as a by-product or undesired product in industrial processes. In some instances it is desired to dispose of the hydrogen sulfide but such disposal may offend existing regulations. For example, aqueous or slightly alkaline solutions of hydrogen sulfide are recovered from some industrial applications and normally are most conveniently disposed of in neighborhood streams. However, the biological oxygen demand of such solutions are detrimental to marine life, and therefore such solutions cannot be disposed of in this manner without prior treatment. In any event, it generally is preferred to convert the hydrogen sulfide to free sulfur where feasible and thereby to recover a useful product at the same time that the aqueous medium is purified for disposal.

The novel process of the present invention provides a flexible method whereby hydrogen sulfide is converted substantially to free sulfur or, when the concentration of hydrogen sulfide in the aqueous solution is not high enough to economically justify this, the aqueous solution is reduced in biological oxygen demand. In either case the resultant treated aqueous solution may be disposed in neighboring streams.

In one embodiment the present invention relates to a method of oxidizing hydrogen sulfide which comprises reacting the same with an oxidizing agent in an aqueous solution having a pH within the range of 7 to 11.5 in the presence of a "sulfur dye" as a catalyst.

In a specific embodiment the present invention relates to a method of oxidizing hydrogen sulfide which comprises forming an aqueous solution of hydrogen sulfide having a pH within the range of 7 to 11.5 and reacting said solution with air in the presence of a "sulfur dye" as a catalyst.

From the hereinbefore embodiments it will be noted that the hydrogen sulfide is oxidized in an aqueous solution having a pH within the range of 7 to 11.5. While water may be used as the solvent, hydrogen sulfide generally is not sufficiently soluble therein and it usually is preferred to utilize a slightly alkaline solution. The alkaline solution must not exceed a pH of 11.5 and thus will range from slightly above 7 to 11.5. In a preferred embodiment this solution is obtained using a nitrogen-containing compound as the solvent and more particularly this solution comprises an ammoniacal solution. In another embodiment this solution may comprise an amine solution and may be selected from primary, secondary or tertiary amines including, for example, methyl amine, ethyl amine, propyl amine, butyl amine, etc., dimethyl amine, diethyl amine, dipropyl amine, dibutyl amine, etc., trimethyl amine, triethyl amine, tripropyl amine, etc., alkanolamines including for example, ethanolamine, propanolamine, butanolamine, diethanolamine, dipropanolamine, etc., heterocyclic amines including, for example, pyridine, pyrrolidine, alkypyridines, alkylpyrrolidines, piperidine, etc., their derivatives and the like. In a preferred embodiment the solution is an aqueous solution, although in some cases it may comprise an alcoholic or solution in other organic solvents or mixtures thereof.

It has been found that the oxidation of hydrogen sulfide to free sulfur is favored at lower pH. Accordingly, in another embodiment of the invention, the pH of the ammoniacal or amine solution may be reduced by including an acidic component in the solution. Organic acids may be employed including formic, acetic, propionic, butyric, etc., or inorganic acids such as boric acid. The acid will be used in a concentration to provide the desired pH to the solution.

Any suitable oxidizing agent is used in the process of the present invention. In most cases air is preferred because of its cheapness and ready availability. However, it is understood that oxygen or other suitable oxygen-containing gases may be employed when desired.

As hereinbefore set forth, oxidation of hydrogen sulfide is effected in the presence of a sulfur dye. A number of sulfur dyes are available commercially. These dyes are not identified by their chemical composition but rather by their commercial designation. The preparation and properties of these dyes are described in the standard Color Index catalogue. Particularly preferred dyes are available from American Cyanamide Company under the names of Calcogene Black GXCF (Color Index No. 53,183) and Sulfur Black SG Unblended (Color Index No. 53,190). Other sulfur dyes available commercially include Hydrone Blue or Solane Blue R (Color Index No. 971), Sulphanol Green 2J (Color Index No. 53,570), Dark Green Sulphanol B (Color Index No. 1002), Brown Sulphanol BR (Color Index No. 53,210), Blue Sulphanol B (Color Index No. 956), Laval Cachou (Color Index No. 933) and Black Sulphanol B (Color Index No. 978). It is understood that the sulfur dyes specifically set forth above are intended solely as illustrative examples and not as limiting the invention thereto and also that the different dyes are not necessarily equivalent.

Oxidation of hydrogen sulfide is effected in any suitable manner. When the hydrogen sulfide is released as a gas stream in an industrial process, the gas stream is passed into contact with an aqueous medium. In one embodiment the hydrogen sulfide gas stream is bubbled into a pool or body of the aqueous solution. In another embodiment the hydrogen sulfide is passed counter-currently to a descending stream of the aqueous solution. The hydrogen sulfide is recovered either as dissolved in the aqueous solution or preferably in a combined state as, for example, ammonium sulfide formed by the reaction and solution in an ammoniacal solvent. In some industrial applications, the hydrogen sulfide is released as an aqueous or ammoniacal solution. In either case the solution is contacted with oxygen in the presence of the sulfur dye.

Conversion of the hydrogen sulfide may be effected in any suitable manner. In one embodiment this may be effected in a batch type operation, in which a reaction zone is charged with the hydrogen sulfide solution and sulfur dye, and oxygen or air is passed therethrough in order to effect oxidation of the sulfide. In a continuous operation the aqueous solution and sulfur dye, either together or separately, are supplied to a reaction zone and air or oxygen is passed concurrently or counter-currently therethrough in a continuing flow. The reaction mixture is continuously withdrawn from the reaction zone and then separated by conventional means including separating zones, distillation zones, filtration, etc. Excess air may be vented to the atmosphere and aqueous solution containing the catalyst may be recycled. The reaction zone preferably is equipped with suitable mixers such as mixing blades, etc., and/or with contacting equipment such as a solid bed of packing material including alumina, bauxite, etc., and/or bubble trays, bubble decks, side to side pans, etc.

Oxidation of hydrogen sulfide is effected at any suitable temperature which may range from ambient to 400° F. or more, preferably being within the range of from 80 to 200° F. Atmospheric pressure may be used although generally superatmospheric pressures will be beneficial in allowing higher operating temperatures while still maintaining liquid phase solvent and increasing the solubility of the vapor phase reactants in the solution. Superatmospheric pressure may range from 5 to 1000 pounds or more p.s.i.g. and preferably from 10 to 100 p.s.i.g.

The oxygen or air is used in a concentration sufficient to effect the desired oxidation of the hydrogen sulfide. In general a slight excess of oxygen is used. Excess oxygen generally will be removed as an overhead stream from the reaction or separation zone and may be vented to the atmosphere or recycled to the process as desired. In the operation producing sulfur, the products from the reaction zone are filtered or otherwise treated to separate sulfur from solution. In an operation in which sulfur is not formed to a substantial extent, the liquid products from the reaction zone now may be disposed of in neighboring streams because of the reduced biological oxygen demand.

As hereinbefore set forth, it has been found that the production of free sulfur is favored at lower pH. Accordingly, in the embodiment of the invention to produce free sulfur, the pH of the solution preferably is in the range of from about 7 to about 9. Also, the production of sulfur is favored by solutions containing the sulfide in a higher concentration and accordingly, in this embodiment of the invention, the sulfide preferably is dissolved in the solution to a relatively high concentration, preferably above 2% and more preferably above 5% and up to the saturation point, and then is subject to oxidation in the manner described heretofore.

In a preferred embodiment the hydrogen sulfide is formed as a solution for further treatment. However, in another embodiment, the hydrogen sulfide may be collected on a solid adsorbent as, for example, basic ion exchange resin, molecular sieves, alumina, silica, magnesia, etc., or mixtures thereof, and the hydrogen sulfide then is oxidized by passing air or oxygen and a solution of the sulfur dye therethrough. In another embodiment a solution of the sulfur dye may be charged to the zone containing the solid adsorbent, and air or oxygen passed threrethrough to effect the desired oxidation.

The following examples are introduced to illustrate further the novelty and utility of the present invention but not with the intention of unduly limiting the same.

Example I 100 cc. of an aqueous solution containing 0.0123 mol of $NH_3$, 0.0078 mol of hydrogen sulfide and 200 parts per million of Sulfur Black SG unblended (Color Index No. 53,190) was charged to a stirred reactor. The pH of the aqueous solution was 11.5. Oxygen from a calibrated oxygen reservoir was introduced into the reactor. This run was made at room temperature.

It was found that 0.113 mol of oxygen were absorbed per mol of hydrogen sulfide per minute. The hydrogen sulfide was completely oxidized within 12 minutes.

Example II

In a run similar to that described in Example I, except that the sulfur dye used in this example was Calcogene Black GXCF (Color Index No. 53,183). The sulfur dye was used in a concentration of 200 parts per million of the aqueous solution.

In this run 0.125 mol of oxygen were absorbed per mol of hydrogen sulfide per minute. The hydrogen sulfide was completely oxidized within 10 minutes.

Example III

Hydrogen sulfide is passed counter-currently in an extraction zone to a descending stream of ammonia solution of which acetic acid had been added in a concentration to yield a solution having a pH of 8.5. The extraction is effected at ambient temperature and a pressure of 100 pounds per square inch. The solution containing hydrogen sulfide as ammonium sulfide is withdrawn from the extraction zone and is commingled with the sulfur dye catalyst. The sulfur dye is Calcogene Black GXCF and is formed as a solution in aqueous ammonium hydroxide containing acetic acid to provide a pH of 8.5. This solution is commingled with the solution containing ammonium sulfide in a concentration to yield 200 parts per million of sulfur dye per total aqueous solution.

The solutions then are charged to a reaction zone and air is continuously supplied thereto. After the reaction is completed, air is vented from the top of the reaction zone and the remaining products are withdrawn from the bottom of the reaction zone and filtered to separate free sulfur from aqueous solution containing catalyst. The aqueous solution is reused for further oxidation. The sulfur preferably is dried and then used for any desired purpose.

I claim as my invention:

1. A method for producing sulfur which comprises oxidizing hydrogen sulfide in the presence of a "sulfur dye" and while dissolved in an aqueous nitrogen compound solution containing an acidic component in an amount to impart to the solution a pH of from about 7 to about 9.

2. The process of claim 1 wherein said solution is an ammoniacal solution.

3. The process of claim 1 wherein said acidic component is acetic acid.

References Cited in the file of this patent

UNITED STATES PATENTS

| | | |
|---|---|---|
| 2,853,432 | Gleim | Sept. 23, 1958 |
| 2,868,617 | Mills | Jan. 13, 1959 |
| 2,897,140 | Gislon et al. | July 28, 1959 |
| 2,975,026 | Mills | Mar. 14, 1961 |

OTHER REFERENCES

"Color Index," second edition, 1956, vol. 2, pages 2361, 2363, 2373, 2385, 2394, 2413, Lund, Humphries & Co., Ltd., England.